United States Patent
Haziza et al.

(10) Patent No.: US 7,861,267 B2
(45) Date of Patent: Dec. 28, 2010

(54) METHOD AND SYSTEM FOR PRESENTING TV CHANNELS

(75) Inventors: Stephane Haziza, Sherman Oaks, CA (US); Praveen Kashyap, Irvine, CA (US); Dang Van Tran, Laguna Niguel, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 595 days.

(21) Appl. No.: 11/825,162

(22) Filed: Jul. 5, 2007

(65) Prior Publication Data

US 2009/0013353 A1     Jan. 8, 2009

(51) Int. Cl.
G06F 3/00      (2006.01)
G06F 13/00     (2006.01)
H04N 5/445     (2006.01)
H04N 7/16      (2006.01)

(52) U.S. Cl. .............. 725/46; 725/41; 725/45; 725/56; 725/139

(58) Field of Classification Search .......... None
See application file for complete search history.

(56) References Cited

U.S. PATENT DOCUMENTS

| | | | |
|---|---|---|---|
| 6,927,806 B2 * | 8/2005 | Chan .................. | 348/731 |
| 6,934,917 B2 * | 8/2005 | Lin ..................... | 715/811 |
| 7,140,032 B2 * | 11/2006 | Dew et al. .......... | 725/46 |
| 2003/0018972 A1 * | 1/2003 | Arora ................. | 725/47 |
| 2004/0019908 A1 * | 1/2004 | Williams et al. .... | 725/46 |
| 2005/0163163 A1 * | 7/2005 | Kim et al. ........... | 370/486 |
| 2007/0011702 A1 * | 1/2007 | Vaysman ............. | 725/45 |
| 2008/0066111 A1 * | 3/2008 | Ellis et al. .......... | 725/57 |

FOREIGN PATENT DOCUMENTS

| | | |
|---|---|---|
| KR | 1019990042395 A | 6/1999 |
| KR | 1020030011918 A | 11/2003 |

OTHER PUBLICATIONS

Office Action dated Apr. 20, 1999 of Korean Patent Application No. 10-2008-0003062 (English-language translation provided).

* cited by examiner

*Primary Examiner*—John W Miller
*Assistant Examiner*—Chris Parry
(74) *Attorney, Agent, or Firm*—Kenneth L. Sherman, Esq.; Michael Zarrabian, Esq.; Myers Andras Sherman & Zarrabian LLP

(57) ABSTRACT

A method and system for presenting TV channels to a viewer is provided. One or more channel lists are generated based on selection criteria. The channel shuffle scanning is performed by presenting per channel content to a viewer from a channel list, for user viewing within a pre-selected period of time until the viewer picks a channel.

38 Claims, 5 Drawing Sheets

METHOD AND SYSTEM FOR PRESENTING TV CHANNELS

FIELD OF THE INVENTION

The present invention relates to television (TV) program selection systems and in particular, to TV channel selection systems.

BACKGROUND OF THE INVENTION

With the proliferation of programming channels for viewing on televisions, many users (viewers) desire different ways of navigating available channels for channel selection.

There are different approaches for navigating through TV channels upon a channel change command. In one case, a pseudo-random generator is used for shuffling channels to view a full range of existing channel numbers. In another case, a selected list of favorite channels is shuffled for viewing.

However, such shuffling approaches do not provide simplified navigation through a large number of available analog/digital TV channels for desired programs. As channel content varies from time to time, navigating channels with existing approaches is time consuming because the viewer must view many channels, or study a grid of program schedules in an electronic program guide (EPG), to select a desired program. There is, therefore, a need for a method and system for TV channel selection, which enables a user to select a desired program easily.

BRIEF SUMMARY OF THE INVENTION

The present invention provides a method and system for presenting TV channels to a viewer. In one embodiment this involves generating one or more channel lists based on selection criteria; and performing shuffle scanning by presenting per channel content to a viewer from a channel list, for user viewing within a pre-selected period of time until the viewer picks a channel.

The present invention enables presenting TV channels by shuffle scan based on the content of the channel when a channel change (shuffle) is performed. In one embodiment, the channels are presented to the user based on their content rather than a channel number. During shuffle scan, the viewer can view program contents of certain channels within a preprogrammed period of time, until the viewer selects a program of interest on a channel to stop the channel shuffling.

These and other features, aspects and advantages of the present invention will become understood with reference to the following description, appended claims and accompanying figures.

DETAILED DESCRIPTION OF THE INVENTION

The present invention provides a method and system for TV channel change by shuffle scan based on the content of the channel at the time a shuffle (channel change) is performed. The viewer can view program contents of certain channels within a pre-programmed period of time, until the viewer selects a program of interest on a channel to stop the channel shuffling.

Figure 1:
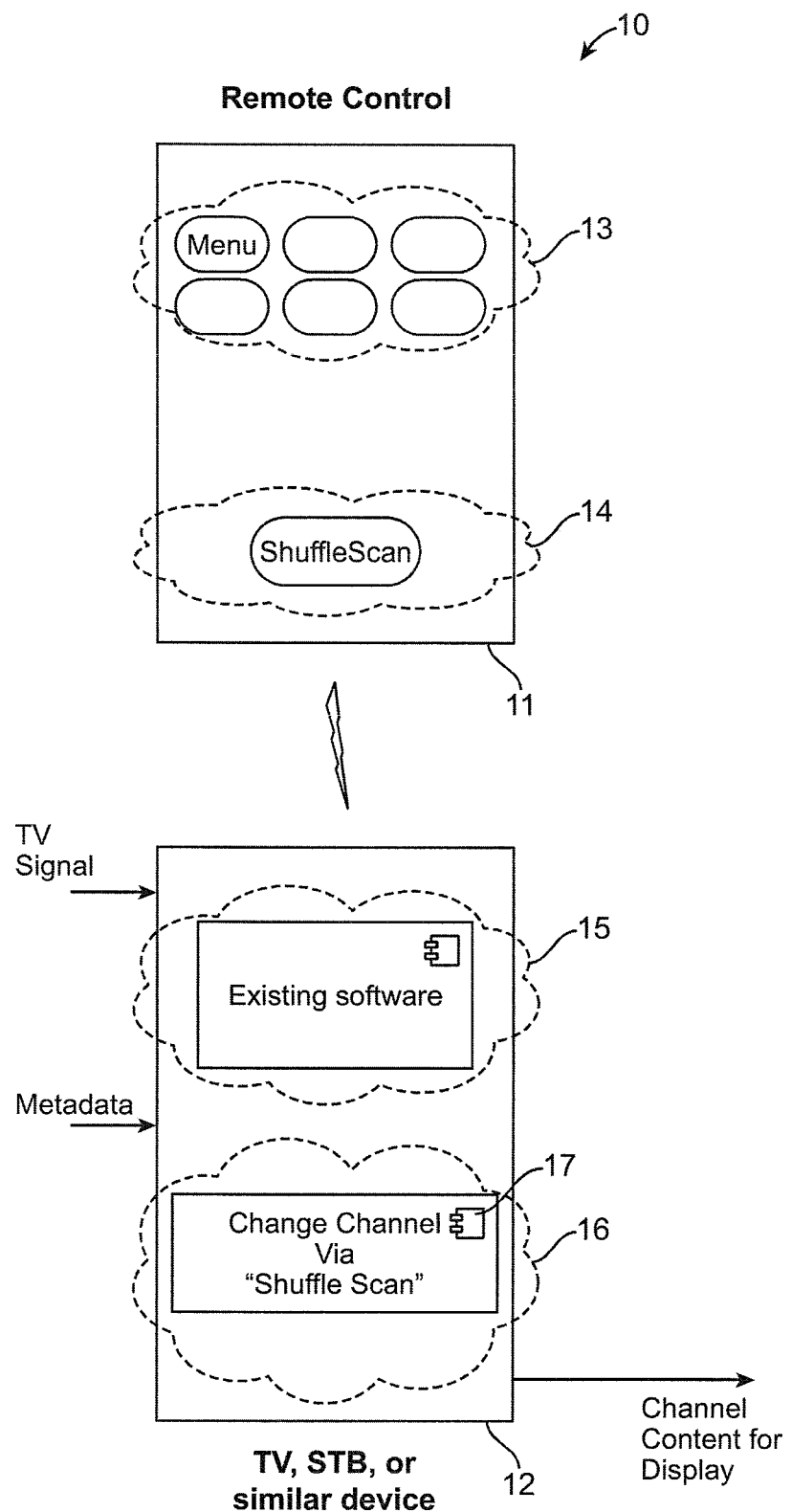
FIG. 1 shows a functional block diagram of a system implementing a TV channel change by shuffle scan, according to an embodiment of the present invention.

FIG. 1 shows a functional block diagram of a system 10 implementing a TV channel change by shuffle scan, according to an embodiment of the present invention. The system 10 includes a controller such as a remote control 11 and a shuffle scan module 16 that can be implemented in a channel tuning/selection device 12 such as in a TV, set-top box (STB) or other device. The remote control 11 includes buttons 13 such as those found on typical remote controls, and a shuffle scan button 14 to control a shuffle scan feature of the shuffle scan module 16.

The shuffle scan module 16 provides shuffle scan according to the present invention. Preferably, the shuffle scan module 16 comprises software including program instructions that can be downloaded to an existing TV or STB via a firmware download. The TV or STB include memory and processor for executing the program instructions. The device 12 also includes conventional software 15 to support conventional channel changing such as by channel number iteration.

A TV shuffling mode (ShuffleScanMode) is provided by the shuffle scan module 16 for "surfing" the large number of available TV channels. The shuffle scan button 14 on the remote control 11 is used to toggle values of the ShuffleScanMode in the shuffle scan module 16. For example, shuffling mode activation can be performed through a menu scheme using the dedicated button 14 on the remote control 11. Shuffling mode activation can also be activated through a sequence of button combinations, understood by the shuffle scan module 16, using existing remote control buttons 12 (as such, a dedicated button 13 is not required). In that case, a conventional remote control can be used to send commands through a sequence of button combinations to the shuffle scan module 16.

Figure 2:
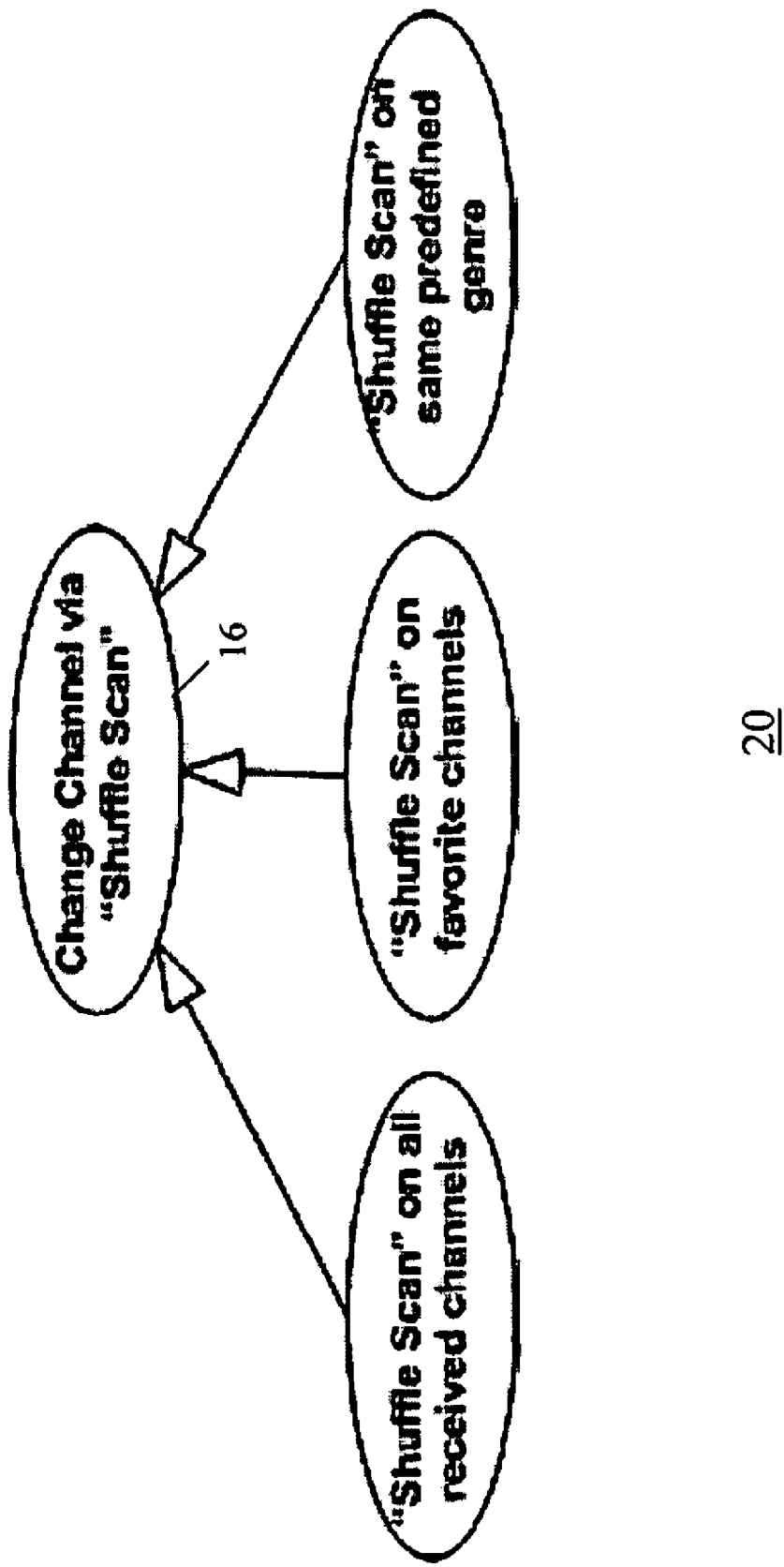
FIG. 2 illustrates an example method of a channel change by shuffle scan, according to an embodiment of the present invention.

Different shuffling modes can be utilized. FIG. 2 illustrates a diagram 20 for channel change via shuffle scan by the shuffle scan module 16, according to an embodiment of the present invention. Multiple channel lists are generated by the shuffle scan module 16 based on certain selection criteria. In this example, the shuffle scan module 16 generates three channel lists, including: an all-received channels list, a favorite channels list and a predefined channels list (e.g., based on genre). Other channel lists based on other criteria are possible. Shuffle scan can be performed based on one or more of: the all-received channels, the favorite channels list and the predefined channels list. One example involves pseudo-random generation of the channel number from a list of existing channel numbers and tuning a list of available/tunable channels. Another shuffle mode searches in a favorites list (pseudo-randomly if instructed), providing selections by, e.g., genre, themes, type, avoid VOD channel, subscription channel through menu options, etc., from a metadata source such as an EPG. Another shuffle mode searches through a list of channels previously viewed by the viewer.

In addition, a cache 17 (FIG. 1) can be used for faster "boosted" channel change (e.g., by reusing the previous values audio/video identification). For digital channels, a list of tuned channels is maintained by caching digital tuning parameters (e.g., MPEG2 PIDs, program number, frequency, modulation) to enable quicker tuning to a channel without the typical time consuming MPEG2 PSI (Program and System Information) parsing. As such, the speed of a channel change is increased in a probabilistic manner, wherein information in the cache, including, e.g., PID audio/video and closed caption, from a previous occasion when a specific channel was tuned (selected) is utilized for tuning again. Such information is updated and used as soon as the next channel change occurs. Meanwhile acquisition of data is started in the background. Eventually in a pre-scanning setup menu the cache information is updated, and a refresh of cached information such as digital tuning parameters occurs depending on viewer needs.

Figure 3:
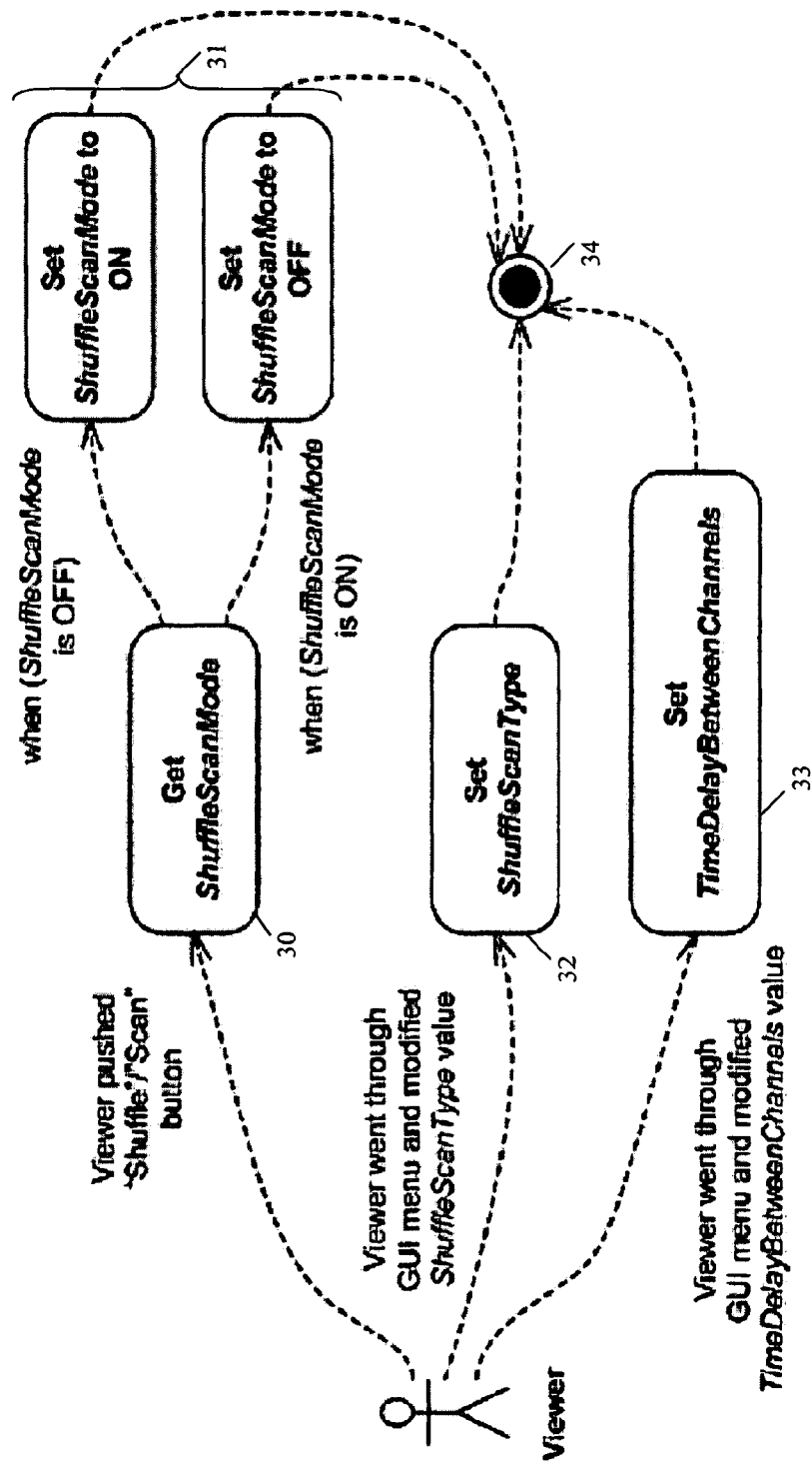
FIG. 3 illustrates an example functional block diagram of a shuffle scan module, according to an embodiment of the present invention.

FIG. 3 illustrates an example block diagram for the shuffle scan module 16, according to an embodiment of the present invention. The shuffle scan module 16 includes a fetch module 30, a set scan mode module 31, a set scan type module 32, a set time delay module 33 and a shuffler module 34.

A viewer can toggle shuffle scanning on and off by toggling a ShuffleScanMode (e.g., a boolean parameter maintained in a register). ShuffleScanMode indicates the state of shuffle scanning, wherein if ShuffleScanMode is true (ON), then shuffle scanning is performed by the shuffler module 34, and if false (OFF), then shuffle scanning is not performed by the shuffler module 34. In this example, using the remote control 11 (FIG. 1), when a viewer pushes the "Shuffle Scan" button 14, the ShuffleScanMode is fetched by the fetch module 30. Then the set scan module 31 toggles the ShuffleScanMode such that if the ShuffleScanMode parameter was OFF, then the ShuffleScanMode parameter is set to ON, and if the ShuffleScanMode was ON then the ShuffleScanMode is set to OFF.

The viewer can further utilize the set shuffle scan type module 31 that provides a graphical user interface (GUI) to modify the value of a ShuffleScanType. The ShuffleScanType parameter is used to hold the state of the shuffle scan type, which as shown by example in FIG. 2 can include: a shuffle all-received channel, a shuffle all favorite channels, or a shuffle channel by genre (FIG. 2). The user's favorite channels can be provided by the user, learned from the user's viewing habits, etc.

In addition, the viewer can utilize the set time delay module 33 that provides a GUI menu to modify the value of a TimeDelayBetweenChannels parameter. The TimeDelayBetweenChannels parameter is used to hold the delay time between tunings. As such, the viewer can adjust the time period during which the viewer can watch a channel before the next shuffle-scan operation tunes to another channel for the user to view. The buttons 13 on the remote control 11 can be used to set values for ShuffleScanType and TimeDelayBetweenChannels in the shuffle scan module 16. Based on the settings by the modules 31, 32 and 33, the shuffler module 34 then performs shuffle scan.

Figure 4:
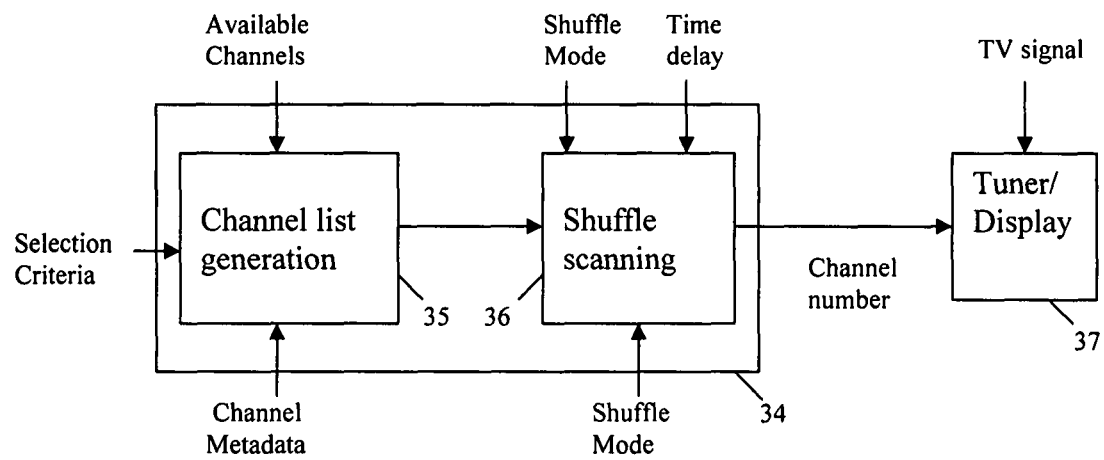
FIG. 4 shows a functional block diagram of a shuffler module, according to an embodiment of the present invention.

FIG. 4 shows a functional block diagram for the shuffler module 34, including a channel list generating module 35 and a shuffle scanning module 36. The shuffler scanner generates channel selections to be tuned/displayed by the tuner/display module 37. The channel list generation module generates one or more channel lists from available channels based on selection criteria and may use channel metadata, as described above.

Figure 5:
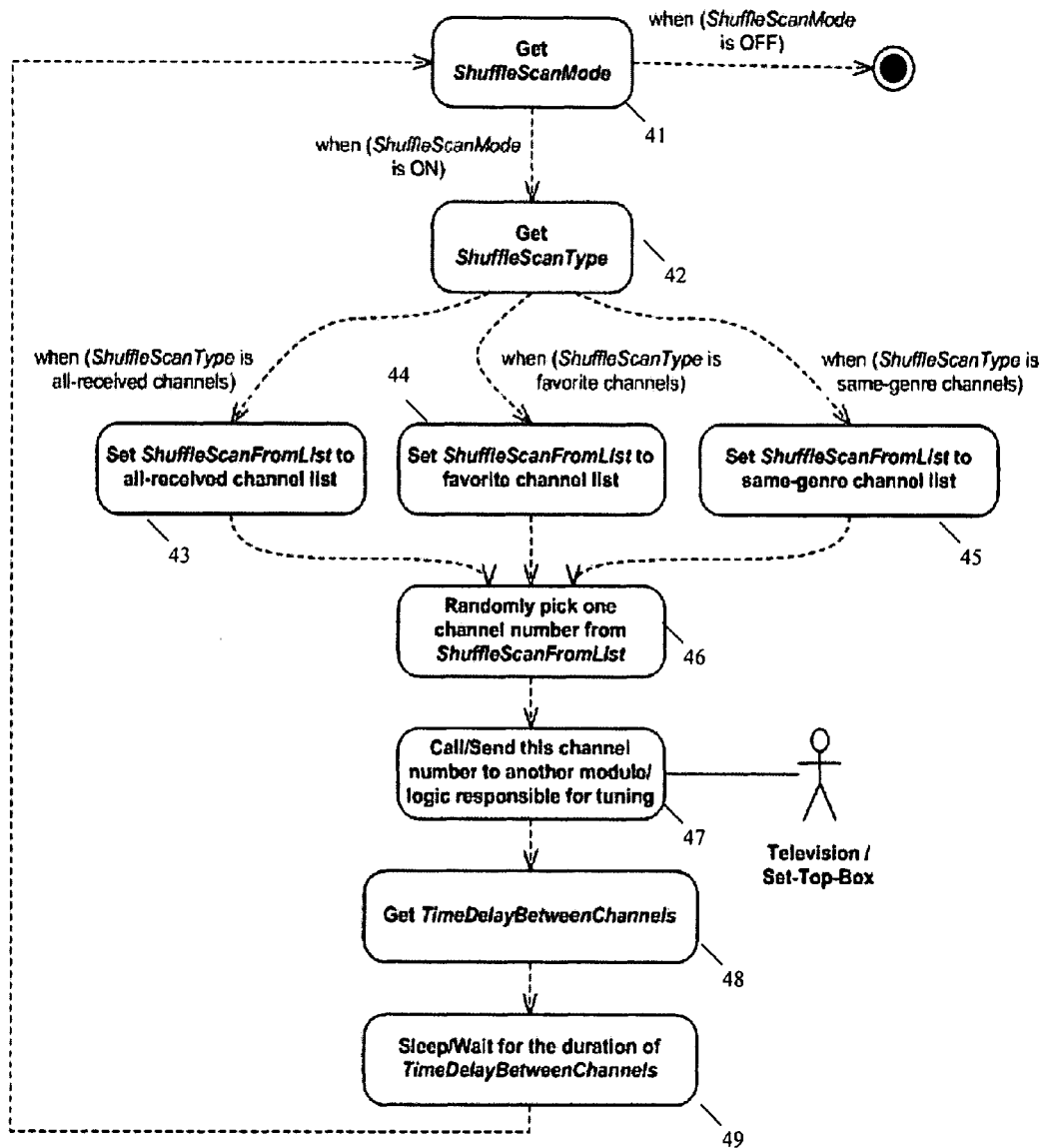
FIG. 5 illustrates an example of performing a channel shuffle, according to an embodiment of the present invention.

FIG. 5 illustrates an example of a process 40 for performing channel shuffle, implemented by the shuffle scanning module 36 according to an embodiment of the present invention, including the steps of:

Step 41: Determine ShuffleScanMode value; if ShuffleScanMode is OFF, remain dormant, otherwise proceed to step 42.

Step 42: Determine ShuffleScanType; if ShuffleScanType is for all-received channels then proceed to step 43, if ShuffleScanType is for favorite channels then proceed to step 44, otherwise if ShuffleScanType is for same-genre channels then proceed to step 45.

Step 43: Set a scan list (i.e., ShuffleScanFromList) to an all-received channel list, and proceed to step 46.

Step 44: Set ShuffleScanFromList to a favorite channel list, and proceed to step 46.

Step 45: Set ShuffleScanFromList to a same-genre channel list, and proceed to steps 46.

Step 46: Randomly pick a channel from the ShuffleScanFromList.

Step 47: Send the picked channel number to a tuning module for tuning and display for user viewing.

Step 48: Obtain the TimeDelayBetweenChannels value.

Step 49: Wait for the duration of TimeDelayBetweenChannels, proceed to step 41 for the next shuffle-scan channel change.

The shuffle-scan operation by the shuffle scanning module 36 continues until the viewer selects a tuned channel for continuous viewing, or stops shuffling (e.g., via the remote control 11). Further, during a pre-programmed viewing time in an automatic shuffle mode, the last few tuned channels are memorized by the system. This reduces overreacted scanning by providing "past" channels instead of the current one.

In another example, if the shuffle mode is implemented in a TV including a double tuner for displaying multiple frames on a TV screen, then an advanced shuffle mode is provided which for a predefined time period presents a pseudo-randomly selected channel, and displays the selected channel along with one or more other channels on the TV screen. The presentation resembles a wall of pictures wherein each picture is an intraframe that is animated as soon as the TV tunes on that particular channel. The viewer experience in accessing channels is enhanced because the system remembers the channels playing. Additionally, another button on the remote control can be programmed to skip unwanted channels identified in certain frames on the TV screen.

A TV channel shuffling system including a shuffle scan module according to the present invention allows a viewer to view program contents on channels, within a pre-programmed period of time, until the viewer selects a program of interest on a channel via a key (e.g., a dedicated button on a remote control) to stop the channel shuffling. As such, the viewer can select a channel based on the channel content at the time a shuffle (channel change) is performed.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of presenting television (TV) channels to a viewer, comprising:
   employing a processor for
      generating one or more channel lists based on selection criteria;

caching digital tuning data for reducing tuning time by storing previously accessed tuning data;

performing shuffle scanning by presenting content for a selected channel and per channel content to a viewer from a channel list, for viewing within a pre-selected period of time until the viewer picks a channel; and tuning to a picked channel using the cached digital tuning data;

wherein the tuning data comprises audio-video packet identifications (PIDs) and closed caption information.

2. The method of claim 1 wherein generating one or more channel lists includes generating a favorites channel list.

3. The method of claim 1 wherein generating one or more channel lists includes generating an all-received channel list.

4. The method of claim 1 wherein generating one or more channel lists includes generating a channel list based on channel content.

5. The method of claim 1 wherein generating one or more channel lists includes generating a channel list based on previously tuned channels.

6. The method of claim 1 wherein performing shuffle scanning includes presenting channels from a list by pseudo-random selection from the channel list.

7. The method of claim 1 further comprising the viewer selecting said period of time.

8. The method of claim 1 wherein presenting per channel content includes tuning a channel for displaying the channel content.

9. The method of claim 1 further including receiving viewer input for selecting a shuffle mode that indicates a channel list selection, wherein performing shuffle scanning further includes presenting per channel content to a viewer from a channel list based on the selected shuffle mode.

10. The method of claim 9 wherein the shuffle mode indicates shuffling on an all-received channels list.

11. The method of claim 9 wherein the shuffle mode indicates shuffling on a favorite channels list.

12. The method of claim 9 wherein the shuffle mode comprises shuffling on a predefined content channels list.

13. The method of claim 9 wherein shuffle scanning further includes:

based on the shuffle mode selection performing TV channel shuffling, including:

when the shuffle mode is for all-received channels, then presenting channels from an all-received channels list;

when the shuffle mode is for favorite channels, then presenting channels from a favorite channels list; and when the shuffle mode is for a genre, then presenting channels from a genre list.

14. The method of claim 13 further comprising, based on the shuffle mode, selectively presenting per channel content to a viewer from the channel lists for a time period.

15. The method of claim 13 further including presenting per channel content to a viewer for a time period, until shuffling is stopped by a viewer.

16. The method of claim 13 further including presenting a channel to the viewer within a pre-selected period of time for selection.

17. The method of claim 13 further comprising randomly picking a channel from one or more channel lists based on the shuffle mode, and presenting the picked channel to the viewer.

18. The method of claim 13 further including presenting a channel to the viewer for a pre-selected period of time, before presenting the next channel.

19. The method of claim 1, further comprising:
updating the tuning information upon a next channel change.

20. The method of claim 19, wherein the tuning information is updated based on viewer selected criteria.

21. The method of claim 1, wherein the selected channel is randomly selected.

22. The method of claim 1, wherein the presented content for the selected channel and per channel content from the channel list is presented as a wall of a plurality of pictures.

23. The method of claim 22, wherein each picture of the plurality of pictures is an intraframe and is animated upon tuning to a corresponding channel.

24. The method of claim 23, further comprising:
programming a remote control to skip undesired channels identified in particular presentation of content in a frame.

25. An apparatus of presenting television (TV) channels to a viewer, comprising:

an electronic hardware device including:
a list generator configured for:
generating one or more channel lists based on selection criteria; and
caching digital tuning data for reducing tuning time by storing previously accessed tuning data; and a channel shuffler configured for performing shuffle scanning by causing presentation of content for a selected channel and per channel content to a viewer on a display device from a channel list, for viewing within a pre-selected period of time until the viewer picks a channel, wherein a picked channel is tuned to using the cached digital tuning data;

wherein the tuning data comprises audio-video packet identifications (PIDs) and closed caption information.

26. The apparatus of claim 25 wherein the list generator is further configured for generating a favorites channel list.

27. The apparatus of claim 25 wherein the list generator is configured for generating an all-received channel list.

28. The apparatus of claim 25 wherein the list generator is configured to generating a channel list based on channel content.

29. The apparatus of claim 25 wherein the list generator is configured for generating a channel list based on previously tuned channels.

30. The apparatus of claim 25 wherein the channel shuffler is further configured for performing shuffle scanning by presenting channels from a list by pseudo-random selection from the channel list.

31. The apparatus of claim 25 further including a tuner for tuning a channel for displaying the channel content.

32. The apparatus of claim 25 wherein the channel shuffler is further configured for performing shuffle scanning by presenting per channel content to a viewer from a channel list based on a selected shuffle mode indicating a channel list selection.

33. The apparatus of claim 32 wherein the shuffle mode indicates shuffling on an all-received channels list.

34. The apparatus of claim 32 wherein the shuffle mode indicates shuffling on a favorite channels list.

35. The apparatus of claim 32 wherein the shuffle mode comprises shuffling on a predefined content channels list.

36. The apparatus of claim 32 wherein the channel shuffler is further configured such that:

when the shuffle mode is for all-received channels, the channel shuffler presents channels from an all-received channels list;

when the shuffle mode is for favorite channels, the channel shuffler presents channels from a favorite channels list; and when the shuffle mode is for a genre, the channel shuffler presents channels from a genre list.

37. The apparatus of claim 36 wherein the channel shuffler is further configured for randomly picking a channel from one or more channel lists based on the shuffle mode, and presenting the picked channel to the user.

38. An apparatus of presenting television (TV) channels to a viewer, comprising:

an electronic hardware device including:

a list generator configured for:

generating one or more channel lists based on selection criteria; and caching digital tuning data comprising audio-video packet identifications (PIDs) and closed caption information for reducing tuning time by storing previously accessed tuning data; and a channel shuffler configured for performing shuffle scanning by causing presentation of content for a randomly selected channel and per channel content to a viewer on a display device from a channel list as a wall of a plurality of pictures, for viewing within a pre-selected period of time until the viewer picks a channel, wherein each picture of the plurality of pictures is an intraframe and is animated upon tuning to a corresponding channel, and a picked channel is tuned to using the cached digital tuning data.

* * * * *